March 24, 1953 J. H. GAULT 2,632,678
SLIDING SEAL FOR LIQUID OXYGEN OR THE LIKE
Filed Aug. 7, 1951
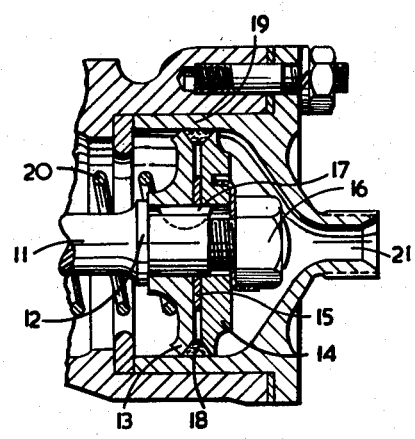
INVENTOR
J. H. GAULT
By Mawkinney + Mawkinney
ATTORNEYS Patented Mar. 24, 1953

2,632,678

UNITED STATES PATENT OFFICE 2,632,678

SLIDING SEAL FOR LIQUID OXYGEN OR THE LIKE

Joseph H. Gault, Coventry, England, assignor to Armstrong Siddeley Motors Limited, Coventry, England Application August 7, 1951, Serial No. 240,714
In Great Britain September 8, 1950

7 Claims. (Cl. 309—23)

The main object of the present invention is to provide a satisfactory sealing plunger, operating in a cylinder, for dealing with a liquified gas, such as liquid oxygen.

The sealing plunger of the invention includes a pair of discs with machined adjacent faces and with adjacent edges jointly providing a peripheral V-slot to receive a deformable ring which has a low coefficient of friction and which does not become brittle even at the low temperature of such a liquid (e. g., a water-dressed leather ring impregnated with beeswax, or a ring of polytetrafluoroethylene), and the discs are clamped together with an interposed distance piece or spacer which is machined to a size such as will ensure the extrusion of the ring in a desirable manner on to the cylinder wall.

The accompanying drawing shows, in sectional elevation, one form of plunger seal according to the invention.

In this drawing, the plunger, for a valve stem in the form of a rod 11 with a shoulder 12 thereon, includes two discs 13, 14 which are located against this shoulder, with an interposed machined spacer 15 between their machined adjacent faces, by means of a nut 16. The discs and spacer are located against turning on the rod by means of a key 17. As stated, the adjacent edges of the discs are machined to provide a V-slot, having, in this instance, an included angle of about 80°, and a deformable ring 18 as aforesaid is received in this slot and pressed at a desirable pressure against the wall of the cylinder 19. A spring 20 is shown as biassing the plunger in one direction, for example, to open a valve member fast with the rod 11, and 21 represents an opening through which fluid pressure can be applied to move the plunger in the other direction.

It should be understood that very great difficulties are encountered when providing a sliding seal for such parts when associated with liquid oxygen, and it has been found that the seal of the invention is very satisfactory in service, as no embrittlement occurs in the ring 18 at such low temperatures.

What I claim as my invention and desire to secure by Letters Patent of the United States is:

1. For dealing with a liquified gas such as liquid oxygen, an axially movable rod, a pair of axially spaced discs held on said rod, said discs having their adjacent faces machined to jointly provide a peripheral V-slot, a deformable ring in said V-slot formed of a material which has a low coefficient of friction and which does not become brittle even at the low temperature of the liquified gas, a cylinder in which said discs and ring slidably operate, and a spacer interposed between said discs and machined to a size such as will ensure the extrusion of the ring, at ambient temperatures, on to the cylinder wall in a desirable manner.

2. For dealing with a liquified gas such as liquid oxygen, an axially movable valve rod having a shoulder thereon, a pair of axially spaced discs keyed on said rod and axially located against said shoulder, said discs having their adjacent faces machined to jointly provide a peripheral V-slot having an included angle of about 80°, a deformable ring carried by said V-slot formed of a material which has a low coefficient of friction and which does not become brittle even at the low temperature of the liquified gas, a cylinder in which said discs and ring slidably operate, and a spacer interposed between said discs and machined to a size such as will ensure the extrusion of the ring, at ambient temperatures, on to the cylinder wall in a desirable manner.

3. For dealing with a liquified gas such as liquid oxygen, an axially movable rod, a pair of axially spaced discs held on said rod, said discs having their adjacent faces machined to jointly provide a peripheral V-slot, a deformable ring of water-dressed leather impregnated with beeswax, a cylinder in which said discs and ring slidably operate, and a spacer interposed between said discs and machined to a size such as will ensure the extrusion of the ring, at ambient temperatures, on to the cylinder wall in a desirable manner.

4. For dealing with a liquified gas such as liquid oxygen, an axially movable rod, a pair of axially spaced discs held on said rod, said discs having their adjacent faces machined to jointly provide a peripheral V-slot, a deformable ring of polytetrafluoroethylene, a cylinder in which said discs and ring slidably operate, and a spacer interposed between said discs and machined to a size such as will ensure the extrusion of the ring, at ambient temperatures, on to the cylinder wall in a desirable manner.

5. For dealing with a liquified gas such as liquid oxygen, an axially movable valve rod having a shoulder thereon, a pair of axially spaced discs keyed on said rod and axially located against said shoulder, said discs having their adjacent faces machined to jointly provide a peripheral V-slot having an included angle of about 80°, a deformable ring of water-dressed leather impregnated with beeswax, a cylinder in which said discs and ring slidably operate, and a spacer interposed between said discs and machined to a size such as will ensure the extrusion of the ring, at ambient temperatures, on to the cylinder wall in a desirable manner.

6. For dealing with a liquified gas such as liquid oxygen, an axially movable valve rod having a shoulder thereon, a pair of axially spaced discs keyed on said rod and axially located against said shoulder, said discs having their adjacent faces machined to jointly provide a peripheral V-slot having an included angle of about 80°, a deformable ring of polytetrafluoroethylene, a cylinder in which said discs and ring slidably operate, and a spacer interposed between said discs and machined to a size such as will ensure the extrusion of the ring, at ambient temperatures, on to the cylinder wall in a desirable manner.

7. A piston adapted to work in a cylinder under the influence of a liquified gas comprising an axially movable rod, two discs on said rod having their opposed faces beveled outwardly and away from one another and with the bevel extending through the peripheral faces of the discs to provide a peripheral V-shaped slot, the walls of said slot being substantially smooth, a deformable sealing ring in said slot and having a low coefficient of friction and being brittle resistant even at the normally low temperature of the liquified gas, and means for moving the walls of said slot towards each other into engagement with the opposite side faces of the ring to impart to the ring motion of translation radially of said discs and to deform at least the outer portion of said ring to cause its outer face to tightly engage the inner wall of the cylinder.

JOSEPH H. GAULT.

REFERENCES CITED

The following references are of record in the file of this patent:

UNITED STATES PATENTS

| Number | Name | Date |
| --- | --- | --- |
| 192,409 | Beck | July 20, 1877 |
| 1,243,648 | Wigle | Oct. 16, 1917 |
| 1,400,477 | Curtis | Dec. 13, 1921 |
| 1,713,031 | Deakins | May 14, 1929 |
| 1,744,565 | McMahon | Jan. 21, 1930 |
| 2,251,952 | Price | Aug. 12, 1941 |
| 2,438,153 | Dick | Mar. 23, 1948 |